United States Patent [19]
Takanoo et al.

[11] Patent Number: 5,331,066
[45] Date of Patent: Jul. 19, 1994

[54] PROCESS FOR PRODUCING POLYESTER ETHER COPOLYMER

[75] Inventors: Yutaka Takanoo; Ikuo Okino; Yasuhiro Nakatani, all of Kobe, Japan

[73] Assignee: Kanegafuchi Kagaku Kogyo Kabushiki Kaisha, Osaka, Japan

[21] Appl. No.: 912,137

[22] Filed: Jul. 9, 1992

Related U.S. Application Data

[63] Continuation of Ser. No. 465,189, Feb. 22, 1990, abandoned.

[30] Foreign Application Priority Data

Jun. 24, 1988 [JP] Japan .................. 63-157605
Jun. 24, 1988 [JP] Japan .................. 63-157606

[51] Int. Cl.$^5$ ............................. C08F 20/00
[52] U.S. Cl. .................... 525/438; 528/272; 528/274; 528/286; 528/297; 528/298; 528/299; 528/300; 528/308; 528/308.6; 525/437; 525/439; 524/710; 524/713
[58] Field of Search ........... 528/272, 274, 286, 297, 528/298, 299, 300, 308, 308.6; 525/437, 438, 439; 524/710, 713

[56] References Cited

U.S. PATENT DOCUMENTS

| | | | |
|---|---|---|---|
| 4,840,984 | 6/1989 | Somemiya et al. | 524/394 |
| 4,914,152 | 4/1990 | Miyashita et al. | 525/68 |
| 4,968,778 | 11/1990 | Still et al. | 528/272 |

FOREIGN PATENT DOCUMENTS 58-018412A 2/1983 Japan .
61-124385A 10/1986 Japan .

Primary Examiner—Samuel A. Acquah
Attorney, Agent, or Firm—Armstrong, Westerman, Hattori, McLeland & Naughton

[57] ABSTRACT

The present invention provides a process for producing a polyester ether copolymer which comprises conducting polycondensation after or while melting and mixing a polyester, of 0.3 (dl/g) or more in intrinsic viscosity, and a polyether having hydroxy groups or their derivatives at its terminals and having a molecular weight of 200 or more. The present invention can dispense with the steps of esterification, transesterification, etc., because of the use of the preformed polyester. Moreover, it shortens the reaction time so that only a small quantity of polyester is produced as a by-product. In addition, since the thermal history of the polyesterh is so small, deterioration of the polymer during production is suppressed. Furthermore, this process enables continuous production of products with good quality, which serves to markedly improve productivity.

12 Claims, 1 Drawing Sheet

PROCESS FOR PRODUCING POLYESTER ETHER COPOLYMER

This application is a continuation division of application Ser. No. 07/465,189 filed Feb. 22, 1990, now abandoned.

TECHNICAL FIELD

The present invention relates to a process for producing polyester ether copolymer, more specifically to a copolymer producing process wherein in producing copolymer comprising polyester obtained from aromatic carboxylic acid or its alkylester and glycol, and polyether, polycondensation reaction is carried out after the polyester, one of the raw materials, and the polyether, the other raw material, were melted and mixed, or while both raw materials are melted and mixed.

BACKGROUND OF THE INVENTION

As polyesterether copolymer is excellent in processability and properties, it collects attention in engineering plastic fields such as automobile and electronic electric parts industries. As methods of producing these polymers, there have been known the following methods: a method for carrying out polycondensation after transesterification, with the polyether being allowed to coexist during transesterification, between an aromatic dicarboxylic acid ester and a glycol; as shown in Laid-open Publication No. 198527/83, a method for carrying out polycondensation after transferring into a polycondensation vessel charged beforehand with a polyether, esterified products from a direct esterification between an aromatic dicarboxylic acid and a glycol; or, as shown in Laid-open Publication No. 19696/73, a method for carrying out polycondensation by adding a polyether after oligoesterification was made by adding alkylene glycol to polyester. These methods, however, contain the following problems: requirement of complicated processes and facilities, no avoidance of poor quality and operability decrease caused by the generation of bu-products of the polyether, such as diethylene glycol, due to longer reaction time, and difficulty in obtaining high polymerization degree due to higher decomposing rate during the reaction in a system containing a large quantity of thermally unstable polyether.

In light of the foregoing situation, the present inventors have made an extensive series of studies to eliminate the above problems to thus provide the present invention.

DISCLOSURE OF THE INVENTION

That is, the present invention relates to a process for producing polyester ether copolymer which comprises conducting polycondensation after, or while, melting and mixing polyester of 0.3 (dl/g) or more in intrinsic viscosity, and polyether having hydroxy groups or their derivatives at the terminals, and having a molecular weight of 200 or more.

THE BEST MODE FOR PRACTICING THE PRESENT INVENTION

Figure 1:
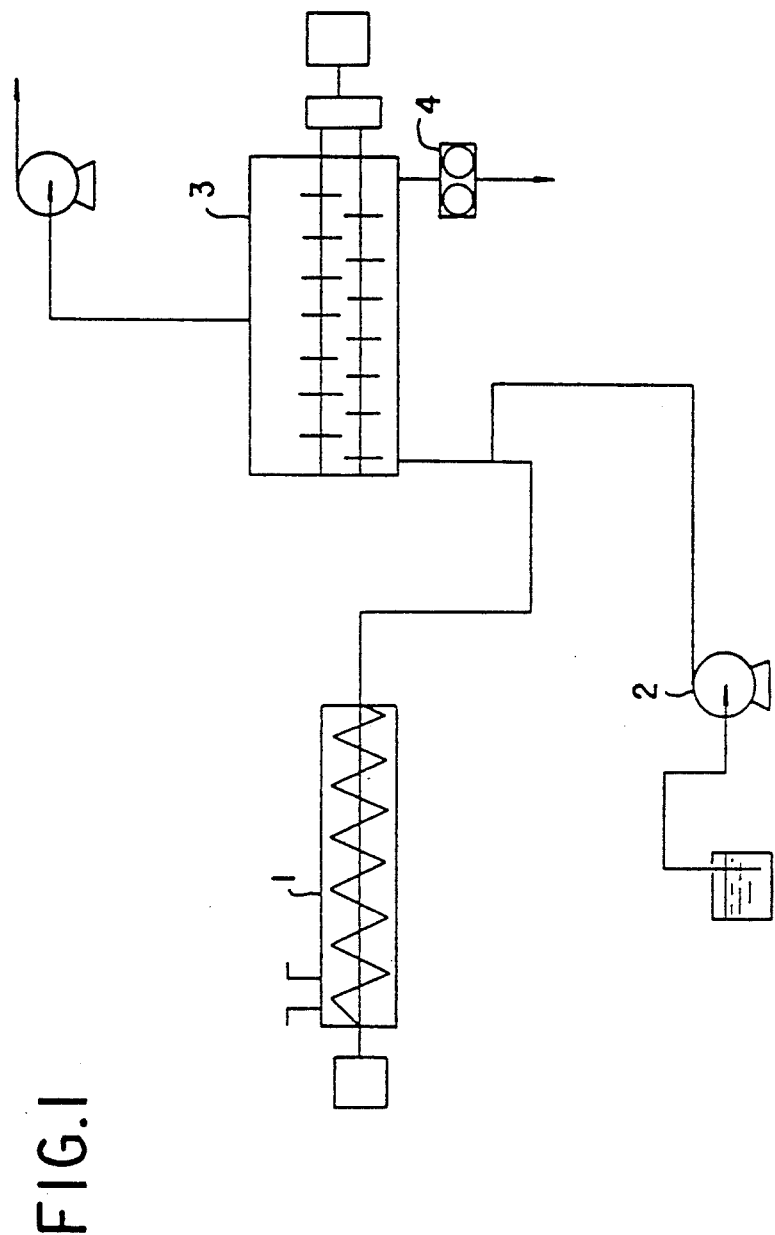
FIG. 1 is a schematic illustration showing an apparatus used in examples of the present invention.

As polyester used in the present invention, there are included homopolymer, copolymer or mixtures thereof which are synthesized from one or more kinds of aromatic dicarboxylic acid or its alkylester and glycol. Examples of aromatic dicarboxylic acids or their alkylesters include terephthalic acid, isophthalic acid, 2,6-naphthalene dicarboxylic acid, 4,4'-dicarboxyldiphenyl, 4,4'-dicarboxylbenzophenone, bis (4-carboxylphenyl) ethane, etc. or their alkylesters of methyl, ethyl or propyl, etc. Examples of glycol include ethylene glycol, propylene glycol, 1,4-butanediol, neopentylglycol and cyclohexanedimethanol, etc.

Among them, from the viewpoint of heat resistance, polyethylene terephthalate is preferable.

As the polyether used in the present invention, those having a general formula (I) can be used:

$R$: $C_2$–$C_9$ alkylene groups (In the formula, R may represent one or more alkylene groups which may be the same or different. There are a total of L such groups which define a polyether having a molecular weight of at least 200.)

However, among them, at least one kind shown in a general formula (II) is preferably used:

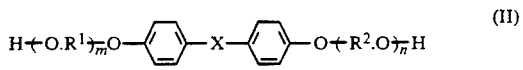

$R^1$, $R^2$: $C_2$–$C_9$ alkylene groups (In the formula, m and n may be the same or different as may be $R^1$ and $R^2$.

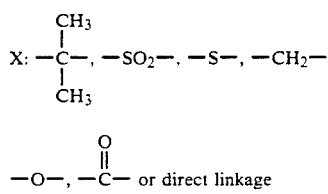

In the above equations (I) and (II), it is natural that hydroxy groups at terminals may be, for example, esterified devivatives. Besides, in the equation (II), aromatics may have substituents such as halogens. In addition, in the equations (I) and (II), R, $R^1$ and $R^2$ are preferably $C_2$–$C_5$ alkylene groups. Among them, substances with aromatic rings in molecular chains such as polyalkyleneoxide addition products of bisphenol A, bisphenol S, etc. are especially favorable since they can be melted and mixed at comparatively high temperatures. The molecular weight of the polyether is 200 or more, preferably 200–10,000. If it is below 200, a melting point of produced polymer unfavorably lowers, while, if it is above 10,000, compatibility decreases and it becomes difficult to obtain uniform quality products. The quantity of the polyether is 1–60 parts by weight, preferably 5–35 parts by weight. If the quantity of polyether is below one part by weight, desired polymer properties cannot be obtained, and if it is above 60 parts by weight, polyether extremely deteriorates and lowers in quality. Intrinsic viscosity of the polyester is 0.3 (dl/g) or more, preferably 0.5 (dl/g) or more. If the intrinsic viscosity is below 0.3 (dl/g), polycondensation time is prolonged unfavorably.

As a melting and mixing method of the polyester and polyether, there can be exemplified two methods: one process wherein the polyether is added into the polyester, which has been melted beforehand, and the other process wherein the polyether is heated to 150°–200° in advance in the presence of a stabilizer, and the polyester is added into the polyether at one time or continuously so that the both become compatible. The latter method is favorable because of the composition being easily and rapidly melted and mixed.

In the present invention, the polyester and polyether are continuously fed and reacted, and the products are continuously discharged so that a polyester ether copolymer can be continuously produced.

As a continuous feeding method of the polyester and the polyether, the followings are exemplified: a process for directly feeding each to a reactor, a process for feeding the both to a preliminary mixing vessel then feeding the mixed raw materials to a reactor, a process for feeding the both to a reactor while being mixed on-line, and a process in which the both raw materials are melted and mixed in advance, remelted after solidification and continuously fed to a reactor. As the reactor, a vertical type and a horizontal type are both usable, but the horizontal type is preferable due to the surface renewability and ease with which residence time can be controlled.

In this way, by melting and mixing and polycondensing the polyester and the generally thermally unstable polyether in a short time, stabilized copolymer can be easily produced.

As the stabilizer used in the present invention, phosphoric esters, phosphorous esters, amine compounds, thioethers and hindered phenol can be used singly or in combination of two or more. Among them, combined use of triphenyl phosphate and hindered phenol is preferable. The quantity of the stabilizer is preferably 0.01–5 parts by weight.

In the present invention, upon production of copolymer, catalysts ordinarily used for promoting reaction such as metallic oxide, carbonate, acetate, alcoholate, etc. can be used singly or in combination of two or more. The most preferable ones among them are tetra-n-butyl titanate, titanyl potassium oxolate, antimony trioxide, germanium dioxide, etc.

In the following examples, the present invention is explained in more detail, but the present invention is not limited thereto.

Various kinds of the values were measured according to the measurement methods below;

(1) Intrinsic viscosity (dl/g);
   Phenol/tetrachloroethane=1/1 (ratio by weight)
   Polymer concentration=0.25 g/dl
   Measurement temperature=25° C.
(2) Color tone; b value according to a color-difference meter
(3) Diethylene glycol (DEG) quantity (% by weight);
   Values measured by gas chromatography after decomposition using methanol/potassium hydroxide
(4) Weight decrease ratio after heating (%);
   Values measured by thermobalance held at 280° C. ×60 min

EXAMPLES 1–4

Raw materials, other than polyester, as shown in Table 1 were charged into a reaction vessel (approximately 4 l) provided with a stirrer and a gas outlet, heated up to 200° C. Then, approximately 3 $\phi$ strand-cut pellet-like polyester was charged at one time into the reaction vessel under normal nitrogen atmospheric pressure, heated and melted at a temperature of up to 260° C. to carry out the polycondensation reaction under 0.5–1 mm Hg.abs.vacuum. The measurement results obtained on the copolymer are shown in Table 3.

TABLE 1

| | EXAMPLE 1 | EXAMPLE 2 | EXAMPLE 3 | EXAMPLE 4 |
|---|---|---|---|---|
| Polyethylene terephthalate 1) | 100 | 100 | 100 | — |
| Polybutylene terephthalate 2) | — | — | — | 100 |
| Polyethylene glycol 3) | 21 | 43 | — | — |
| Bisphenol A polyethylene oxide addition product 4) | — | — | 43 | 43 |
| Triphenyl phosphate | 0.38 | 0.76 | 0.76 | 0.76 |
| Irganox 1010 5) | 0.58 | 1.17 | 1.17 | 1.17 |
| Antimony trioxide | 0.05 | 0.05 | 0.05 | 0.05 |

Numerals in the table are expressed in parts by weight.
1) Intrinsic viscosity 0.6 dl/g
2) Intrinsic viscosity 0.8 dl/g
3) Molecular weight 1.500
4) Molecular weight 1,000
5) Registered trademarks, manufactured by Ciba-Geigy Co., Ltd.

EXAMPLE 5

Using the same apparatus as used in EXAMPLES 1–4, 100 parts (parts by weight, the same hereafter) of approximately 3 $\phi$ strand-cut pellet-like polyethylene terephthalate (intrinsic viscosity 0.6 dl/g) were charged into the reaction vessel and heated and melted at a temperature of up to 260° C., while keeping inside temperatures not below 240° C., 43 parts of bisphenol A polyethylene oxide addition product (molecular weight 1,000), 0.76 part of triphenyl phosphate, 1.17 parts of Irganox 1010 and 0.05 part of antimony trioxide were continuously added and heated at a temperature up to 260° C. to carry out the polyconsensation reaction under 0.5–1 mm Hg.abs. vacuum. The measurement results obtained on copolymer are shown in Table 3.

COMPARISON EXAMPLES 1, 4

Using the same apparatus as used in the above EXAMPLES, raw materials shown in Table 2 were charged at one time into the reaction vessel, the predetermined quantity of methanol was caused to distill out at approximately 200° C., then the contents were heated up to 260° C. to carry out polycondensation under 0.5 mm Hg.abs. vacuum. The measurement results obtained on copolymer are shown in Table 4.

TABLE 2

|  | COMPARISON EXAMPLE 1 | COMPARISON EXAMPLE 4 |
|---|---|---|
| Dimethylterephthalate | 102 | 92 |
| Ethylene glycol | 59 | — |
| 1,4-butanediol | — | 77 |
| Bisphenol A polyethylene oxide addition product* | 43 | 43 |
| Triphenyl phosphate | 0.76 | 0.76 |
| Irganox 1010 | 1.17 | 1.17 |
| Tetra n-butyl titanate | 0.035 | 0.035 |

*Molecular weight 1,000

COMPARISON EXAMPLE 2

Using the same apparatus as used in the above EXAMPLES, except that it was additionally provided with a rectifying tube, as a first step, a slurry of 36.4 parts of terephthalic acid and 16.4 parts of ethylene glycol were continuously added to 52.8 parts of bishydroxyethyl terephthalate pentamer for approximately 3 hours with the inside temperature held at 240° C. to distill out the predetermined quantity of water by rectification. Then, 43 parts of bisphenol A polyethylene oxide addition product (molecular weight 1,000), 0.76 part of triphenyl phosphate, 1.17 part of Irganox-1010 and 0.05 part of antimony trioxide were added and heated to 260° C. to carry out polycondensation under 0.5 mm Hg.abs. vacuum. The measurement results obtained on copolymer are shown in Table 4.

COMPARISON EXAMPLE 3

Using the same apparatus as used in the above EXAMPLES, 100 parts of polyethylene terephthalate tips (intrinsic viscosity 0.6 dl/g), 135 parts of ethylene glycol and 0.099 part of zinc acetate were charged into the reaction vessel and oligoesterified with ethylene glycol circulated for 1 hour at 200° C., then 43 parts of polyethylene glycol (molecular weight 1,500), 0.76 part of triphenyl phasphate, 1.17 parts of Irganox-1010 and 0.05 part of antimony trioxide were charged and heated to 260° C. to carry out polycondensation under 0.5 mm Hg.abs. vacuum. The measurement results obtained on copolymer are shown in Table 4.

TABLE 3

|  | EX. 1 | EX. 2 | EX. 3 | EX. 4 | EX. 5 |
|---|---|---|---|---|---|
| Reaction time (including temperature elevation and melting) | 1.6 | 1.8 | 1.7 | 1.8 | 2.6 |
| Intrinsic viscosity (dl/g) | 0.76 | 0.80 | 0.80 | 1.00 | 0.80 |
| Intrinsic viscosity decrease per one hour ($\Delta IV/Hr$) | 0.003 | 0.005 | 0.007 | 0.001 | 0.005 |
| Color tone | 3.0 | 3.9 | 3.7 | 3.5 | 3.7 |
| DEG quantity (% by weight) | 0.8 | 0.9 | 0.9 | 0 | 0.9 |
| Weight decrease ratio after heating (%) | 3.3 | 6.4 | 4.3 | 4.7 | 5.9 |

TABLE 4

|  | COMP. EX. 1 | COMP. EX. 2 | COMP. EX. 3 | COMP. EX. 4 |
|---|---|---|---|---|
| Reaction time (Total) | 6.5 | 7.5 | — | 7.0 |
| Time from transesterification and esterification to completion of polycondensation | 3.5 | 3.3 | 4.5 | 3.3 |
| Intrinsic viscosity (dl/g) | 0.80 | 0.80 | 0.80 | 1.00 |
| Intrinsic viscosity decrease per one hour ($\Delta IV/Hr$) | 0.018 | 0.015 | 0.020 | 0.011 |
| Color tone | 4.5 | 4.0 | 4.8 | 3.9 |
| DEG quantity (% by weight) | 1.3 | 1.1 | 2.1 | 0 |
| Weight decrease ratio after heating (%) | 9.5 | 8.9 | 9.0 | 7.8 |

EXAMPLE 6

Using an apparatus as shown in FIG. 1, 100 parts (parts by weight, the same hereafter) of polyethylene terephthalate, 0.23 part of hindered phenol type stabilizer and 0.15 part of triphenyl phosphate were extruded by an extruder (1), 5.26 parts of bisphenol A polyethylene oxide addition product (molecular weight approximately 1,000) were continuously supplied by a pump (2) and the resulting product was continuously discharged by a pump (4), so that their residence time in a reactor (3) amounted to 15 minutes. The temperature of the contents and the vacuum inside the reaction vessel were 275° C. and 0.5-1 mm Hg.abs, respectively. The results are shown in Table 5.

EXAMPLE 7

Using the same apparatus as used in EXAMPLE 6, 100 parts of polyethylene terephthalate, 1.17 parts of hindered phenol type stabilizer and 0.76 part of triphenyl phosphate were extruded by the extruder (1), 43 parts of bisphenol A polyethylene oxide addition product (molecular weight approximately 1,000) were continuously supplied by a pump (2) and the resulting product was continuously discharged by a pump (4), so that their residence time in the reactor (3) amounted to 25 minutes. The temperature of contents and vacuum inside the reaction vessel were 270° C. and 0.5-1 mm Hg.abs, respectively. The results are shown in Table 5.

EXAMPLE 8

The procedure was conducted in the same manner as EXAMPLE 7, except that the residence time in the reaction vessel was changed to 40 minutes. The results are shown in Table 5.

COMPARISON EXAMPLE 5

Using a reaction vessel (approximately 4 l) provided with a stirrer and a gas outlet, 105 parts of bishydroxyethyl terephthalate pentamer were charged and heated to 260° C., and then under normal atmospheric pressure 5.25 parts of bisphenol A polyethylene oxide addition product (molecular weight 1,000), 0.23 part of hindered phenol type stabilizer, 0.15 part of triphenyl phosphate and 0.05 part of antimony trioxide were charged and heated to 275° C. for 120 minutes under 0.5-1 mm Hg.abs. vacuum to carry out polycondensation. The results are shown in Table 5.

COMPARISON EXAMPLE 6

Using the same apparatus as in COMPARATIVE EXAMPLE 5, 105 parts of bishydroxyethyl terephthalate pentamer were charged and heated to 260° C., and then under normal atmospheric pressure 43 parts of bisphenol A polyethylene oxide addition product (molecular weight 1,000), 1.17 parts of hindered phenol type stabilizer, 0.75 part of triphenyl phosphate and 0.05 part of antimony trioxide were charged and heated up to 270° C. to carry out polycondensation for 200 minutes under 0.5-1 mm Hg.abs. vacuum. The results are shown in Table 5.

COMPARATIVE EXAMPLE 7

The procedure was conducted in the same manner a in COMPARISON EXAMPLE 6, except that the polycondensation time was changed to 300 minutes. The results are shown in Table 5.

TABLE 5

|  | EX. 6 | EX. 7 | EX. 8 | COMP. EX. 5 | COMP. EX. 6 | COMP. EX. 7 |
|---|---|---|---|---|---|---|
| Reaction time (min) | 15 | 20 | 40 | 120 | 200 | 300 |
| Intrinsic viscosity (dl/g) | 0.59 | 0.80 | 0.91 | 0.60 | 0.80 | 0.77 |
| Intrinsic viscosity decrease per one hour ($\Delta IV/Hr$) | 0.004 | 0.005 | 0.005 | 0.010 | 0.025 | 0.055 |
| Color tone | 2.4 | 3.7 | 3.5 | 2.5 | 4.0 | 7.8 |
| DEG quantity (% by weight) | 0.9 | 0.6 | 0.6 | 0.9 | 1.1 | 2.7 |
| Weight decrease ratio after heating (% by weight) | 4.8 | 6.2 | 6.4 | 5.2 | 8.9 | 13.4 |

POSSIBILITY OF INDUSTRIAL UTILIZATION

As explained above, the present invention has various advantages as follows, and greatly contributes to industry:

(1) Since polyester is used as raw material, an esterification process is not required.

(2) The quantity of polyether by-product is small owing to shortened reaction time. Moreover, deterioration of polymer during production is not only suppressed owing to reduced thermal history of polyether, but production of comparatively high IV products is easily made possible.

(3) Since production time is extraordinarily shortened and operation cycle becomes fast to thus enhance productivity greatly.

(4) By adopting a continuous reaction and discharge process, the residence of the product in a reaction vessel upon discharge is eliminated, and polymerization degree is thereby not reduced.

We claim:

1. A process for producing a polyester ether copolymer which comprises conducting polycondensation after or while melting and mixing a polyester polymer of 0.5 (dl/g) or more intrinsic viscosity, and a polyether polymer having hydroxy groups at its terminals and having a number average molecular weight of 200 to 10,000.

2. The process of claim 1, wherein the main chain of the polyether is expressed by a general formula (I).

$$HO(R.O)_L \quad (I)$$

where R is the same or different and comprise $C_2$–$C_9$ alkylene groups, and L is the number of R.O units.

3. The process of claim 1, wherein the polyester is a homopolymer, a copolymer or mixtures thereof which are the product of reacting at least one member from the group consisting of terephthalic acid, isophthalic acid, 2,6 naphthalene dicarboxylic acid, 4,4'-dicarboxy diphenyl, 4,4'-dicarboxy benzophenone, bis (4-carboxyphenyl) ethane and their alkylesters of ethyl, methyl and propyl, with at least one member selected from the group consisting of ethylene glycol, propylene glycol, 1,4-butanediol, neopentyl glycol, diethylene glycol and cyclohexane dimethanol.

4. The process of one of claims 1 or 3, wherein the polyester is a polyethylene terephthalate.

5. The process of one of claims 1 or 3, wherein the polyester is in a form of pellet, or flake or powder obtained from crushing.

6. The process of claim 1, wherein after or while adding the polyester into the polyether which has been heated beforehand to melt and mix them, polycondensation is conducted.

7. The process of claim 1, wherein at least one kind of stabilizer is used which is selected from the group consisting of phosphoric esters, ester phosphites, amine compounds, thioethers and hindered phenols.

8. The process of claim 1, wherein polycondensation is conducted continuously.

9. The process of claim 4, wherein the polyester is in a form of pellet, or flake or powder obtained from crushing.

10. The process of claim 4, wherein after or while adding the polyester into the polyether heated beforehand to melt and mix them, polycondensation is conducted.

11. The process of claim 5, wherein after or while adding the polyester into the polyether heated beforehand to melt and mix them, polycondensation is conducted.

12. The process of claim 1, wherein the main chain of the polyether is expressed by a general formula (II),

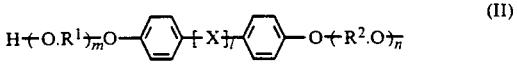

(II)

wherein $R^1$ and $R^2$ are the same or different $C_2$–$C_9$ alkaline groups
m and n may be the same or different such that the molecular weight of said polyether is at least 200, and
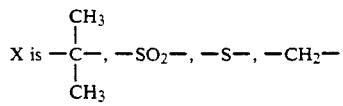
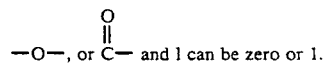, or $\overset{\overset{O}{\|}}{C}-$ and l can be zero or 1.
* * * * *